(12) United States Patent
Clessienne et al.

(10) Patent No.: US 7,835,424 B2
(45) Date of Patent: Nov. 16, 2010

(54) PATH SELECTION METHOD AND DEVICE

(75) Inventors: Thierry Clessienne, Issy les Moulineaux (FR); Sylvain Bratschi, Villejuif (FR)

(73) Assignee: France Telecom, Paris (FR)

( * ) Notice: Subject to any disclaimer, the term of this patent is extended or adjusted under 35 U.S.C. 154(b) by 762 days.

(21) Appl. No.: 11/792,771

(22) PCT Filed: Dec. 2, 2005

(86) PCT No.: PCT/FR2005/003041

§ 371 (c)(1),
(2), (4) Date: Jun. 8, 2007

(87) PCT Pub. No.: WO2006/061500

PCT Pub. Date: Jun. 15, 2006

(65) Prior Publication Data

US 2008/0084946 A1    Apr. 10, 2008

(30) Foreign Application Priority Data

Dec. 8, 2004   (FR)   .................................. 04 13105

(51) Int. Cl.
*H04B 1/00* (2006.01)
(52) U.S. Cl. .................. 375/148; 375/144; 375/347
(58) Field of Classification Search ................ 375/142, 375/143, 147, 148, 150, 152, 347, 144
See application file for complete search history.

(56) References Cited

U.S. PATENT DOCUMENTS 6,229,842 B1    5/2001    Schulist et al.
7,151,948 B2 *   12/2006    Ishii et al. .................... 455/522

FOREIGN PATENT DOCUMENTS

EP    1 322 045 A    6/2003
WO    WO 02/29996 A    4/2002

* cited by examiner

*Primary Examiner*—David B Lugo
(74) *Attorney, Agent, or Firm*—Cohen Pontani Lieberman & Pavane LLP

(57) ABSTRACT

A method and to a device for selecting paths of a multipath channel. The method selects a path if an estimate of the relative contribution of the current path to the output signal-to-noise ratio of the receiver exceeds a given threshold.

11 Claims, 3 Drawing Sheets

PATH SELECTION METHOD AND DEVICE

RELATED APPLICATIONS

This is a U.S. National Phase Application under 35 USC 371 of International Application PCT/FR2005/003041 filed on Dec. 2, 2005.

FIELD OF THE INVENTION

The present invention relates to the field of telecommunications. Within that field, the invention relates more particularly to digital communications. Digital communications include wireless communications in which the transmission channel is a radio channel.

The invention relates to a method of selecting paths of a multipath transmission channel and to a device for effecting such a selection, software for implementing the method, and a medium for that software. The path selection process is part of the processing effected by the receiver and is generally implemented in the physical layers of telecommunications systems.

The telecommunication systems to which the invention particularly applies are spread spectrum systems. Such systems include those employing the WCDMA (Wide Code Division Multiple Access), MC-CDMA (Multi-Carrier Code Division Multiple Access), and UWB (Ultra Wide Band) techniques.

BACKGROUND OF THE INVENTION

At present, wireless communication is primarily used in cellular networks, in the radio local loop, and in radio broadcasting. The exponential growth of wireless communication and the scarcity of radio-frequency wavelengths makes it crucial to optimize the RF spectrum resource.

The transmission channel is usually considered as a sum of diracs, i.e. as the same signal repeated and superposed on itself several times, with a plurality of variable offsets. The processing by the receiver usually includes tuned filtering followed by correlation. After tuned filtering, a correlation is effected with the conjugate of the code modulating the symbol for each delay associated with one of the selected paths. The correlation result is multiplied by the conjugate of the estimate of the amplitude of the path, and the various results are finally summed.

In radio transmission, the transmitted signal can take different paths between the sender and the receiver. Thus the receiver may receive different delayed and phase-shifted replicas of the transmitted signal that add constructively and/or destructively. With some kinds of destructive addition, the phenomenon known as total fading can occur. Diversity techniques are of some efficacy in the fight against the phenomena of serious fading. Those diversity techniques are classified into various categories: space diversity, polarization diversity, frequency diversity, time diversity, multipath diversity.

A typical rake receiver takes multipath diversity into account. Such a receiver synchronizes all the paths and then combines them by means of a maximum radio combining (MRC) process. That type of receiver has been the subject of numerous enhancements since the introduction of spread spectrum communication systems such as UMTS and CDMA 2000.

At the combination stage, the processing by the receiver may include a selection process. At present, the selection process can be a semidynamic selection process (GSC algorithm), a threshold selection process, or a static selection process (MRC algorithm).

Adaptive GSC algorithms achieve the best compromise between complexity and bit error rates. They have an output threshold, generally a target signal-to-noise ratio (SNR), for determining the number of fingers of the rake to be taken into account. Provided that the output of the rake receiver is not above this threshold, the receiver increases the number of fingers to be taken into account and thus the number of paths to be combined. These algorithms include:

The Kim, Ha, and Reed algorithm described in the document by SuK Won Kim, Dong S. Ha, and J. H. Reed "Minimum Selection GSC and Adaptive Low-Power Rake Combining Scheme", IEEE, 2003. The objective of that algorithm is to guarantee a target bit error rate (BER) at the output of the receiver; and The Alouini and Yang algorithm described in the document by Mohamed-Slim Alouini and Hong-Chuan Yang "MRC Diversity with an Output Threshold", IEEE ICC', 2004. That algorithm uses the same principle as the preceding algorithm, from which it differs in that it adds paths until the SNR of the recombined signal is equal to or greater than a predetermined target SNR.

Those algorithms are disadvantageous when the SNR obtained after combining all the paths remains below the target SNR. To guarantee an instantaneous output SNR, those algorithms select all the paths even though paths with a low SNR can have a negative effect on the SNR obtained after combination.

SUMMARY OF THE INVENTION

An object of the present invention is to eliminate the drawbacks of the prior art algorithms, and in particular to optimize the energy expended by the receiver in relation to an output signal-to-noise ratio; optimizing the energy expended includes minimizing the number of operations effected.

This and other objects are attained in accordance with one aspect of the invention directed to a method of selecting paths of a multipath channel. The path selection process comprises the steps of:

selecting a path from the various paths for which the instantaneous signal-to-noise ratio is the highest instantaneous signal-to-noise ratio of the various paths;

initializing the output signal-to-noise ratio of the receiver to the highest instantaneous signal-to-noise ratio of the various paths; and initializing a current path to a path for which the instantaneous signal-to-noise ratio is lower than the instantaneous signal-to-noise ratio of the path previously selected and the highest instantaneous signal-to-noise ratio of the other paths.

The path selection process further includes the following steps, which are executed in a loop and comprise, for each iteration of the loop:

selecting the current path if an estimate of the relative contribution of the current path to the output signal-to-noise ratio of the receiver exceeds a given threshold and, if not, exiting the loop;

adding to the output signal-to-noise ratio of the receiver the instantaneous signal-to-noise ratio of the current path; and initializing the current path to a path different from the preceding selected paths, for which the instantaneous signal-to-noise ratio is the highest instantaneous signalto-noise ratio of the various paths and lower than the instantaneous signal-to-noise ratio of the last path previously selected.

Another aspect of the invention is directed to a device for selecting paths of a multipath channel, the device comprising:

a module for selecting a path from the various paths for which the instantaneous signal-to-noise ratio is the highest instantaneous signal-to-noise ratio of the various paths;

a module for initializing the output signal-to-noise ratio of the receiver to the highest instantaneous signal-to-noise ratio of the various paths;

a module for initializing a current path to a path for which the instantaneous signal-to-noise ratio is lower than the instantaneous signal-to-noise ratio of the path previously selected and the highest instantaneous signal-to-noise ratio of the other paths; and a module for executing the following steps, which are executed in a loop:

selecting the current path if an estimate of the relative contribution of the current path to the output signal-to-noise ratio of the receiver exceeds a given threshold and, if not, exiting the loop;

adding to the output signal-to-noise ratio of the receiver the instantaneous signal-to-noise ratio of the current path; and initializing the current path to a path different from the preceding selected paths, for which the instantaneous signal-to-noise ratio is the highest instantaneous signal-to-noise ratio of the various paths and lower than the instantaneous signal-to-noise ratio of the last path previously selected.

The method and the device of the invention solve the stated problem.

Taking paths successively into account as a function of their SNR ensures the fastest progression of the output SNR, and comparing the relative contribution of each path to the output SNR with a threshold limits the number of paths selected.

This minimizes the number of paths taken into account by the method and the device, while simultaneously maximizing the output signal-to-noise ratio of the device; minimizing the number of paths contributes to minimizing the number of operations.

Unnecessary operations are avoided by comparing the contribution of each path to a threshold in decreasing SNR order. If there were no comparison, the first path to arrive would always be selected. If that path corresponds to a fading gap, then taking it into account would lead to effecting operations that would prove to be unnecessary and would unnecessarily increase the complexity of the reception process. In the method of the invention, this path is taken into account only if its relative contribution to the output SNR exceeds the fixed threshold.

The method and the device of the invention are also advantageous compared to an algorithm that assumes an a priori knowledge of the number of paths to be selected, because they dispense with this a priori knowledge. If the instantaneous SNR of the signal were below a target SNR, such an algorithm would select all the paths, whereas the number of paths selected is limited in the method of the invention. This limitation reduces complexity by eliminating computations that are unnecessary or that even have a negative impact on the SNR and therefore on the quality of service (QoS). The lower the SNR of the paths, the worse the estimate of their power and consequently the more the output SNR is degraded.

The invention optimizes the spectrum resource by improving the transmitter-receiver link budgets, which for radio transmission extends the radio coverage for a given transmission power and reduces the consumption of the communication terminal by limiting the operations effected by the receiver.

In a preferred embodiment, the steps of the method are determined by the instructions of a path selection program incorporated in a path selection device, and the method of the invention is executed when that program is loaded into the device and the operation of the device is then controlled by the execution of the program.

Consequently, the invention applies equally to a computer program adapted to implement the invention, in particular a computer program on or in an information medium. This program can use any programming language and can be in the form of source code, object code, or an intermediate form of code between source code and object code, such as a partially compiled form, or in any other desirable form for implementing a method of the invention.

The computer program may be carried by a transmissible medium such as an electrical or optical signal, which can be routed via an electrical or optical cable, by radio, or by other means. The program of the invention may in particular be downloaded over an Internet-type network. The corresponding digital signal includes codes for the execution of a method of the invention by a selection device.

Alternatively, the computer program can be stored on an information medium that can be any entity or device capable of storing the program. For example, the medium can include storage means such as a ROM, for example a CD ROM or a microelectronic circuit ROM, or magnetic storage means, for example a diskette (floppy disk) or a hard disk. The information medium may be an integrated circuit such as a signal processor, an ASIC, a dedicated circuit or any equivalent product in which the program is incorporated, the circuit being adapted to execute or to be used in the execution of the method in question.

Another aspect of the invention is directed to a receiver including a path selection device of the invention.

Another aspect of the invention is directed to a communications terminal including a path selection device of the invention.

Other features and advantages of the invention become apparent in the course of the following description with reference to the appended drawings, which are provided by way of non-limiting example.

DETAILED DESCRIPTION OF THE DRAWINGS

Figure 1:
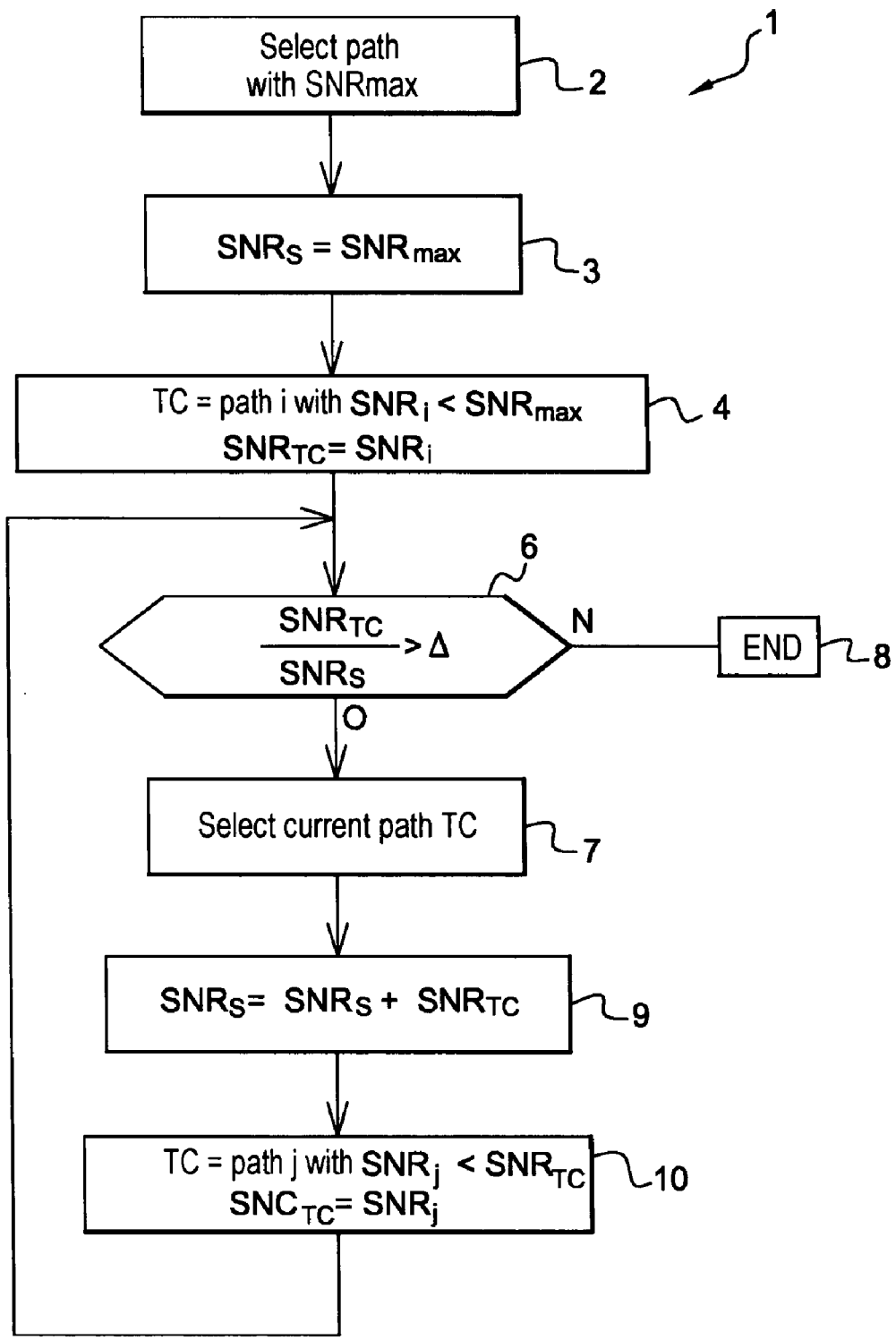
FIG. 1 is a flowchart of a method of the invention.

The flowchart shown in FIG. 1 illustrates one example of a method of the invention.

The method 1 selects paths of a multipath channel. It includes the following steps:

A step 2 of selecting a path from the various paths of the channel, which is a radio channel in the context of radio transmission. The path selected is the path whose instantaneous SNR is the highest of the instantaneous SNRs of the various paths.

A step 3 of initializing the output SNR of the receiver to the highest instantaneous SNR of the various paths.

A step 4 of initializing a current path to a path whose instantaneous SNR is lower than the instantaneous SNR of the path previously selected and the highest instantaneous SNR of the other paths.

Figure 2:
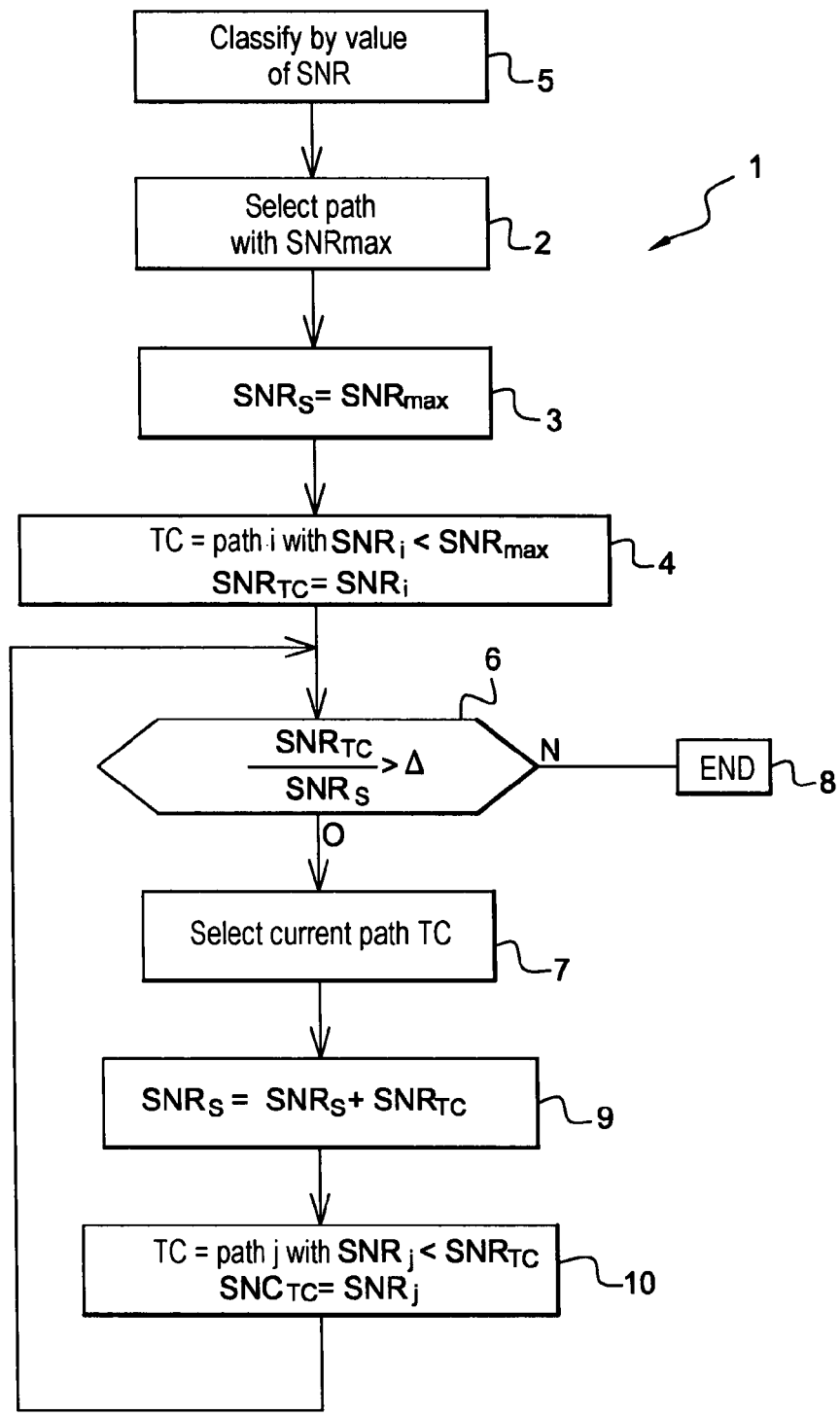
FIG. 2 is a flowchart of one particular example of a method of the invention.

Accordingly, when, as shown in FIG. 2, the method further includes a step 5 of classifying the paths as a function of their SNRs, the current path is the path closest to the path previously selected in the classification. If the classification is in decreasing SNR order, the current path is the path following the previously selected path in the classification; in contrast, if the classification is in increasing order, the current path is the path preceding the previously selected path in the classification.

The method further includes the following steps, which are executed in a loop.

At the beginning of each loop iteration, a test step 6 for estimating the relative contribution of the current path to the SNR of the receiver. The current path is selected in a step 7 of selecting the current path if the estimate of the relative contribution of the current path to the output SNR of the receiver is above a given threshold $\Delta$. If that estimate is not above the threshold then the loop is interrupted (step 8). The simplest way to estimate the contribution is to compute the ratio between the SNR of the current path and the output SNR of the receiver.

A step 9 of computing the output SNR. The output SNR of the receiver is increased by the instantaneous SNR of the current path.

A step 10 of initializing the current path. The new current path is initialized to a path different from the preceding selected paths. This path is that whose instantaneous SNR is the highest instantaneous SNR of the various paths and lower than the instantaneous SNR of the last path previously selected.

Accordingly, when, as shown in FIG. 2, the selection process further includes a step 5 of classifying the paths as a function of their SNR, the new current path is the path in the classification nearest the path previously selected at the beginning of the loop iteration.

Following the initialization step 10, the process loops to begin a new iteration.

Figure 3:
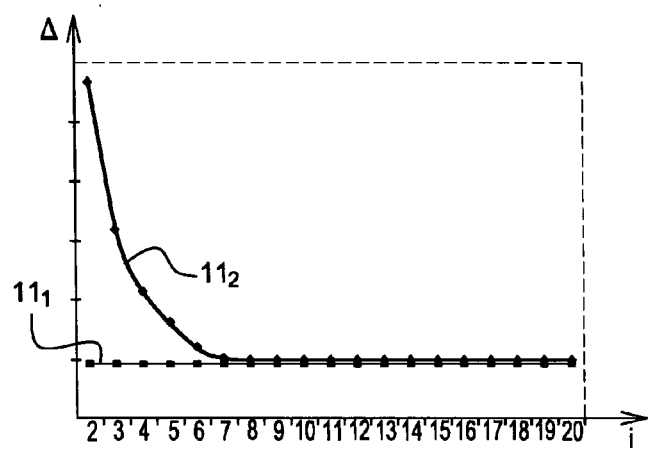
FIG. 3 is a diagram of examples of weighting functions for determining thresholds.

In one particular embodiment, the threshold $\Delta$ is determined by a weighting function. A first example of this weighting function sets a constant threshold $\Delta$ regardless of the iteration index i. The curve $11_1$ in FIG. 3 illustrates one example of such a weighting function. To determine the threshold $\Delta$ used in the iteration, a second example of a weighting function takes account of the loop iteration index. The curve $11_2$ in FIG. 3 shows an example of such a weighting function. Thus, in the example shown, the corresponding weighting function $11_2$ determines a threshold $\Delta$ which decreases as the iteration index i increases and then remains constant beyond a given number of iterations. The decrease in this threshold can have a profile close to that of a 1/n curve. One example of this is a situation where, at the time of selection by an MRC (maximum radio combining) type algorithm, all the paths, which are assumed to be of equal power, are taken into account below a certain iteration $\alpha$ and then excluded above that iteration $\alpha$.

Thus, although a path may be carrying energy, that path and any additional path are excluded if the relative contribution of that path to the output SNR is below the threshold $\Delta$ determined by the iteration index $\alpha$, which corresponds to the number of paths taken into account in the example illustrated by FIG. 3.

Moreover, and in one particular embodiment, the method can set a target SNR for the output SNR of the receiver, which means that the method of the invention is interrupted as soon as the output SNR of the receiver exceeds this target SNR.

Figure 4:
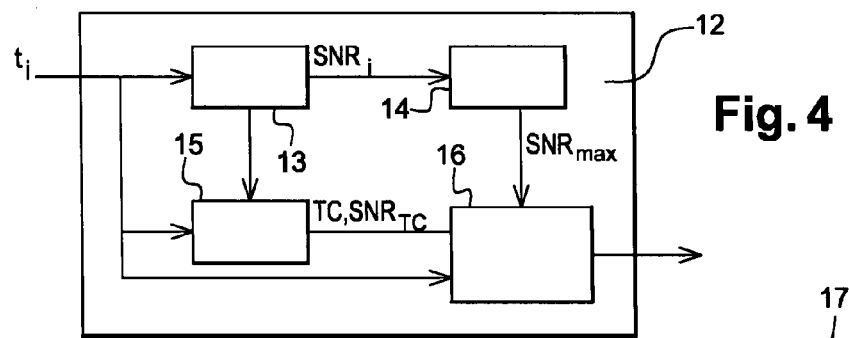
FIG. 4 is a diagram of a selection device of the invention.

FIG. 4 represents diagrammatically one particular embodiment of a selection device 12 of the invention. The device comprises:

- a module 13 for selecting from the various paths the one for which the instantaneous SNR is the highest instantaneous SNR of the various paths;
- a module 14 for initializing the output SNR of the receiver to the highest instantaneous SNR of the various paths;
- a module 15 for initializing a current path to a path for which the instantaneous SNR is lower than the instantaneous SNR of the path previously selected and the highest instantaneous SNR of the other paths; and
- a module 16 for effecting the following steps, which are executed in a loop:
    - selecting the current path if an estimate of the contribution of the current path to the output SNR of the receiver exceeds a given threshold and, if not, exiting the loop;
    - adding to the output SNR of the receiver the instantaneous SNR of the current path; and
    - initializing the current path to a path different from the preceding selected paths, for which the instantaneous SNR is the highest instantaneous SNR of the various paths and lower than the instantaneous SNR of the last path previously selected.

Each of the modules can correspond either to a portion of the same hardware resource of a receiver, for example a DSP, or to independent circuits such as integrated circuits, for example microchips. Alternatively, the modules may be distributed over a plurality of resources that combine DSP and circuits.

Figure 5:
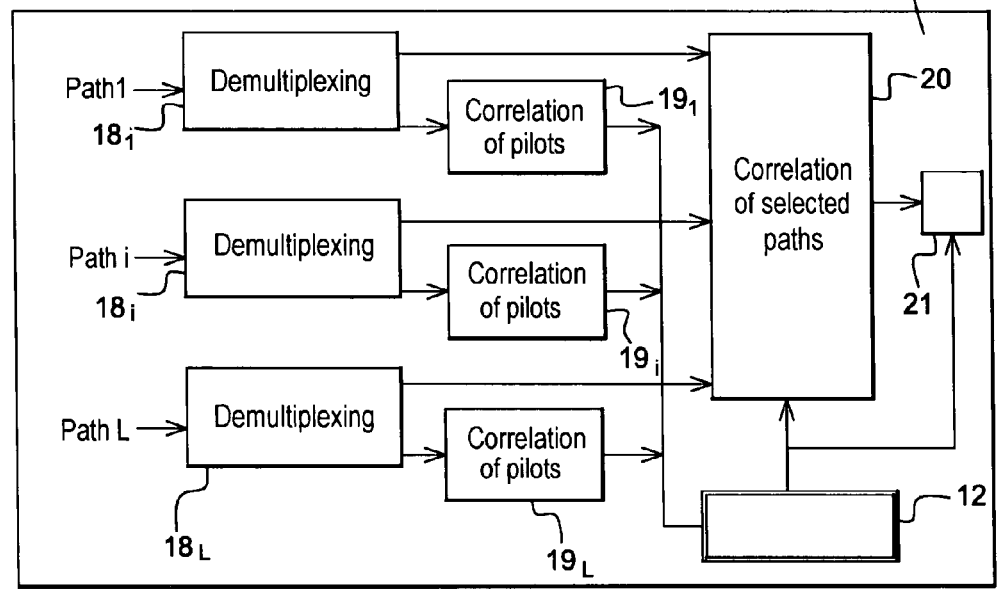
FIG. 5 is a diagram of a radio receiver of the invention.

FIG. 5 illustrates one particular embodiment of a receiver of the invention in a radio transmission context. The rake receiver 17 shown includes demultiplexing modules $18_1, \ldots, 18_i, \ldots, 18_L$, pilot correlation modules $19_1, \ldots, 19_i, \ldots, 19_L$, a selected path correlation module 20, a selection device 12 of the invention, and a combination module 21.

Each demultiplexing module $18_i$ has an input that takes into account a path i. The module $18_i$ extracts symbols and data from the path i and supplies them at its output.

Each pilot correlation module $19_i$ computes an instantaneous SNR of a path i from the symbols supplied by the demultiplexing module $18_i$ and supplies the instantaneous SNR at its output.

The selection device 12 takes into account the various instantaneous SNRs of the various paths and determines which paths are to be selected. The selection is supplied to the path correlation module 20 and to the combination module.

The path correlation module 20 correlates the selected paths and supplies the correlation results to the combination module 21.

The combination module 21 combines the correlation results for the selected paths using the MRC (maximum ratio combining) technique.

A typical use of the invention relates to the field of radio transmission. The receiver is then typically a radio receiver and the communications terminal is typically a mobile telephone including such a receiver. The terminal can take other forms and can correspond to a PDA (personal digital assistant), a laptop computer, or more generally any communicating object.

The invention claimed is:

1. A path selection method (1) for selecting paths of a multipath channel, comprising the steps of:
    selecting (2) a path from the various paths for which the instantaneous signal-to-noise ratio is the highest instantaneous signal-to-noise ratio of the various paths;
    initializing (3) the output signal-to-noise ratio of the receiver to the highest instantaneous signal-to-noise ratio of the various paths;
    initializing (4) a current path to a path for which the instantaneous signal-to-noise ratio is lower than the instantaneous signal-to-noise ratio of the path previously selected and the highest instantaneous signal-to-noise ratio of the other paths; and
    the following steps, which are executed in a loop and comprise, for each iteration of the loop:
        selecting (7) the current path if an estimate of the relative contribution of the current path to the output signal-to-noise ratio of the receiver exceeds a given threshold and, if not, exiting (8) the loop;
        adding (9) to the output signal-to-noise ratio of the receiver the instantaneous signal-to-noise ratio of the current path; and
        initializing (10) the current path to a path different from the preceding selected paths, for which the instantaneous signal-to-noise ratio is the highest instantaneous signal-to-noise ratio of the various paths and lower than the instantaneous signal-to-noise ratio of the last path previously selected.

2. The path selection method (1) according to claim 1, wherein the given threshold is determined by means of a weighting function (11).

3. The path selection method (1) according to claim 2, wherein to determine the threshold the weighting function (11) takes the loop iteration index into account.

4. The path selection method (1) according to claim 1, further including a comparison step that compares each new output signal-to-noise ratio of the receiver to a target in order to interrupt the process as soon as the threshold is exceeded.

5. The path selection method (1) according to claim 1, further including a step (5) of classifying the paths by increasing signal-to-noise ratio.

6. A path selection device (12) for selecting paths of a multipath channel, comprising:
    a module (13) for selecting a path from the various paths for which the instantaneous signal-to-noise ratio is the highest instantaneous signal-to-noise ratio of the various paths;
    a module (14) for initializing the output signal-to-noise ratio of the receiver to the highest instantaneous signal-to-noise ratio of the various paths;
    a module (15) for initializing a current path to a path for which the instantaneous signal-to-noise ratio is lower than the instantaneous signal-to-noise ratio of the path previously selected and the highest instantaneous signal-to-noise ratio of the other paths; and
    a module (16) for executing the following steps, which are executed in a loop:
        selecting the current path if an estimate of the relative contribution of the current path to the output signal-to-noise ratio of the receiver exceeds a given threshold and, if not, exiting (8) the loop;
        adding to the output signal-to-noise ratio of the receiver the instantaneous signal-to-noise ratio of the current path; and
        initializing the current path to a path different from the preceding selected paths, for which the instantaneous signal-to-noise ratio is the highest instantaneous signal-to-noise ratio of the various paths and lower than the instantaneous signal-to-noise ratio of the last path previously selected.

7. The path selection device (12) according to claim 6, further including a module adapted to compute the given threshold by means of a weighting function.

8. The path selection device (12) according to claim 7, further including a module for classifying the paths in order of increasing signal-to-noise ratio.

9. A receiver (17) comprising a path selection device (12) according to claim 6.

10. A communication terminal comprising a path selection device (12) according to claim 6.

11. A non-transitory computer-readable storage medium including program instructions for executing a method (1) according to claim 1 when said program is loaded into and executed in a receiver.

* * * * *